United States Patent [19]

Hasegawa et al.

[11] Patent Number: 5,093,215
[45] Date of Patent: Mar. 3, 1992

[54] TERMINAL MEANS FOR LEAD STORAGE BATTERY

[75] Inventors: Yoshio Hasegawa, Takatsuki; Kenji Kawaguchi; Shuji Takahashi, both of Wako, all of Japan

[73] Assignees: Yuasa Battery Co., Ltd., Osaka; Honda Giken Kogyo Kabushiki Kaisha, Tokyo, both of Japan

[21] Appl. No.: 520,427

[22] Filed: May 8, 1990

[30] Foreign Application Priority Data

May 10, 1989 [JP] Japan .................. 1-54381[U]

[51] Int. Cl.⁵ .............................................. H01M 2/30
[52] U.S. Cl. ...................... 429/178; 429/121; 439/766; 439/768; 439/801; 439/813
[58] Field of Search .............. 429/121, 178; 439/380, 439/569, 765, 766, 768, 811, 801, 813, 809

[56] References Cited

U.S. PATENT DOCUMENTS 3,165,369 1/1965 Maston ........................ 439/380
4,769,295 9/1988 Kudo et al. ................ 429/121 X
4,898,796 2/1990 Furukawa et al. ............ 429/178

FOREIGN PATENT DOCUMENTS 270449 6/1988 European Pat. Off. ............ 439/813
58-157968 10/1983 Japan .
1-89162 4/1989 Japan ........................ 439/801
379828 9/1932 United Kingdom .............. 439/801

OTHER PUBLICATIONS

WPI Abstract No. C83-103838, Corresponding to Japanese 58—157968 (9/83).

*Primary Examiner*—Stephen Kalafut
*Attorney, Agent, or Firm*—Armstrong, Nikaido, Marmelstein, Kubovcik & Murray

[57] ABSTRACT

A nut anti-slipping member is provided, which has a nut insertion groove and covers bottom end portions of one-side opening end of a nut insertion hole. A nut is inserted in the nut insertion hole with the nut deviated from the nut anti-slipping member. In case when the nut is of a square-pole-shape type with rectangular section, the entire nut can pass upper parts of the anti-slipping member when the nut is inserted in the nut insertion hole in a horizontally longitudinal position, and a bottom part of the nut can pass the nut insertion groove when the nut is inserted in the nut insertion hole in a vertically longitudinal position.

5 Claims, 2 Drawing Sheets

TERMINAL MEANS FOR LEAD STORAGE BATTERY

BACKGROUND OF THE INVENTION

1. Industrial useful field

This invention relates to a terminal means for a lead storage battery comprising a terminal on which a nut insertion hole is made penetratingly in a lateral direction and a bolt insertion hole connected to the nut insertion hole is made, and a nut inserted in the nut insertion hole of the terminal.

2. Prior art

In vehicles such as a motor bicycle including many types and designed into compact form, a volume and shape of a space for incorporating a lead storage battery are limited to a maximum extent. Even in lead storage batteries having the same size, a motor bicycle side wire harness terminal will differ in design for receiving a wire harness, such as receiving the harness from a front surface of lead storage battery and receiving it from an upper surface thereof, depending on the type of bicycle. In order to provide versatility for these purposes by using only one kind of lead storage battery, a battery has been proposed wherein bolt insertion holes have been made on two places, i.e. a side surface and an upper surface, of a square-pole-shaped and hollow terminal and a nut insertion hole has been made on a front surface of the terminal, as described in Japanese Unexamined Utility Model Publication No. 58157968. An object of this invention has been to enable a motor bicycle side wire harness terminal to be fitted from both the side surface and upper surface of battery by inserting a nut into the nut insertion hole from the front surface. Further, another object has been to enable free exchange of bolt and nut, because threads of bolt and nut have been damaged due to corrosion before completion a service life of lead storage battery.

However, the motor bicycle is inclined during maintenance work because its stand bar is set upright. When the lead storage battery once removed is to be installed again, a wire harness side terminal hole is adjusted to the bolt insertion hole of the battery terminal with one hand and the bolt is inserted in the hole with the other hand. Therefore, even if the nut has been previously inserted in the nut insertion hole from the front surface, the battery cannot be installed by only one man in case of the motor bicycle which inclines to cause the nut to slip off from the nut insertion hole, because the nut slips off from the nut insertion hole when his hand leaves the nut.

SUMMARY OF THE INVENTION

Object of the invention

An object of this invention is to provide a terminal means for a lead storage battery which can positively prevent a nut from slipping off by using a nut anti-slipping member when carrying out a bolt-fitting work under a state where a nut insertion side surface of a terminal is inclined to an oblique downward direction, and therefore enables one-man installation work of lead storage battery easily and quickly.

Another object of the invention is to provide a terminal means for a storage battery which enables easy exchange of a nut when threads of the nut are corroded.

Further another object of the invention is to provide a terminal means for a storage battery which can positively prevent a nut from slipping off regardless of a nut inserting position in case when the nut is of a square pole type with rectangular section.

Structure of the invention

A terminal means for a lead storage battery comprising a terminal on which a nut insertion hole is made penetratingly in a lateral direction and a bolt insertion hole connected to the nut insertion hole is made, and a nut inserted in the nut insertion hole of the terminal, characterized by that a nut anti-slipping member is provided which has a nut insertion groove and covers both bottom end portions of one-side opening end of the nut insertion hole, and the nut is inserted in the nut insertion hole with the nut deviated from the nut anti-slipping member.

DETAILED DESCRIPTION OF THE INVENTION

Embodiment

Figure 1:
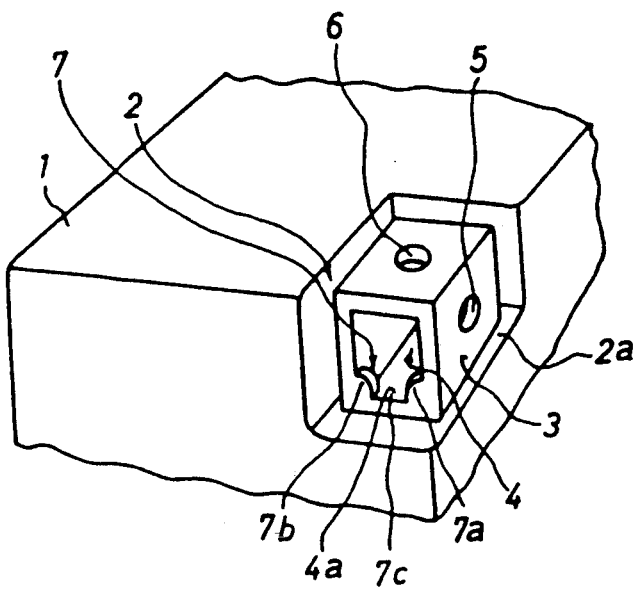
FIG. 1 is an external perspective view of a terminal means for a lead storage battery of an embodiment according to this invention.
Figure 2:
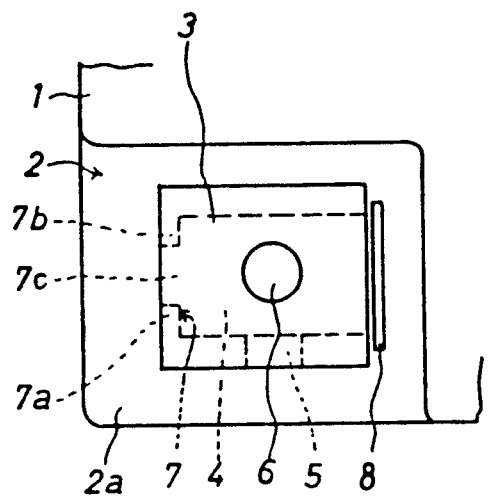
FIG. 2 is a plan view of the same.
Figure 3:
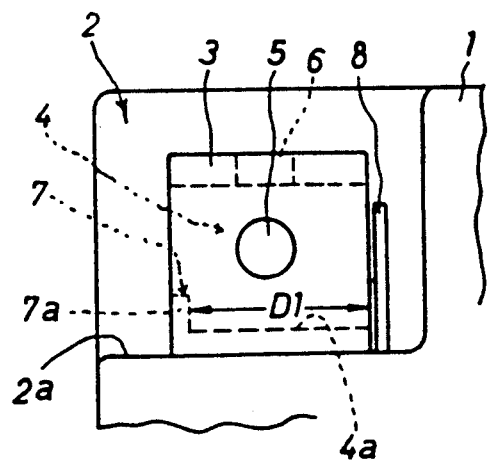
FIG. 3 is a front view of the same.
Figure 5:
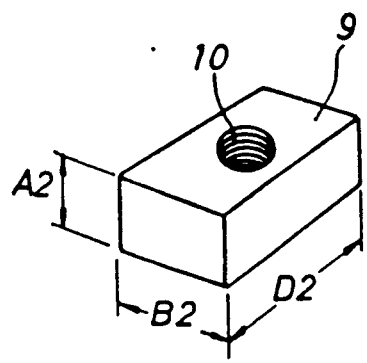
FIG. 5 is an external perspective view of a nut.

As illustrated in FIGS. 1-3, a cover 1 for a lead storage battery is made, for example, of synthetic resin such as polypropylene etc. having an elasticity, and a square-pole-shaped concave portion 2 is formed at a corner of front upper left end. A square-pole-shaped terminal 3 made of lead alloy protrudes from a bottom surface 2a of the concave portion 2. A square-pole-shaped nut insertion hole 4 is penetratingly made on the terminal 3 in its lateral direction. Namely, the nut insertion hole 4 opens to both side surfaces of the terminal 3, and opening ends are square. A round bolt insertion hole 5 connected to the nut insertion hole 4 is formed on the terminal 3 at its front surface, and a round bolt insertion hole 6 connected to the nut insertion hole 4 is also made thereon at its upper surface. A nut anti-slipping member 7 is installed integrally in the vicinity of a left side surface of the terminal 3 in such a manner as protruding from a bottom wall 4a of the nut insertion hole 4. The nut anti-slipping member 7 is composed of segmental small pieces 7a and 7b facing each other with a prescribed space left therebetween, and a clearance between the facing surfaces of the small pieces 7a and 7b composes a nut insertion groove 7c. A flat-shaped stopper 8 is installed integrally in the vicinity of a right side surface of the terminal 3 in such a manner as protruding from the bottom surface 2a of the concave portion 2 of the cover 1. A nut 9 inserted in the nut insertion hole 4 is formed into a square-pole-shape as illustrated in FIG. 5, and a threaded hole 10 in which a bolt (not-shown) is being screwed therein is formed on the nut.

Figure 4:
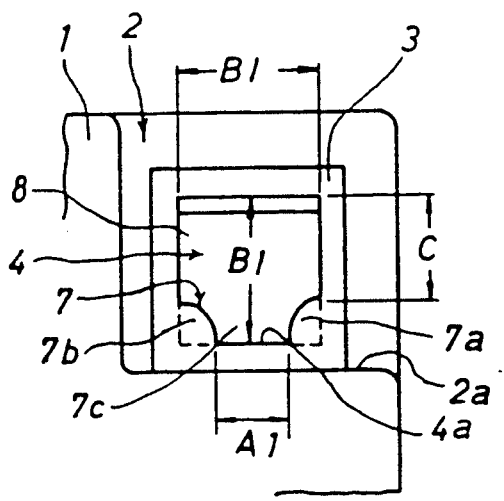
FIG. 4 is a left side view of the same.

A lateral dimension A1 (FIG. 4) of the nut insertion groove 7c is set a little larger than a dimension A2 (FIG. 5) of a short-side of a side surface of the nut 9 so that a relation of A1 > A2 is realized. That is, a bottom portion of the nut 9 can pass the nut insertion groove 7c when the nut 9 is inserted in the nut insertion hole 4 in a vertically longitudinal position, i. e. in a position where a long-side of the side surface of the nut 9 is put in vertical direction. Vertical and lateral dimensions B1 (FIG. 4) of the nut insertion hole 4 are set a little larger than a dimension B2 (FIG. 5) of a long-side of the side surface of the nut 9 so that a relation of B1>B2 is realized. That is, the nut 9 can be inserted in the nut insertion hole 4 in a horizontally longitudinal position, i. e. in a position where a short-side of the side surface of the nut 9 is put in vertical direction. A dimension C (FIG. 4) between upper ends of the small pieces 7a and 7b and a top wall of the nut insertion hole 4 is set a little larger than the dimension A2 (FIG. 5) of the short-side of side surface of the nut 9. An upper end of the stopper 8 is located at a position little lower than the top wall of the nut insertion hole 4, and a width of the stopper 8 is set a little wider than the lateral dimension B1 (FIG. 4) of the nut insertion hole 4. A dimension D1 (FIG. 3) between the stopper 8 and fronting surfaces of the small pieces 7a and 7b is set a little larger than a lateral dimension D2 (FIG. 5) of the nut 9 so that a relation of D1>D2 is realized. The bolt insertion hole 5 is located at a position where it is roughly aligned with the threaded hole 10 when the nut 9 is inserted in the nut insertion hole 4 in the vertically longitudinal position and installed in place. The bolt insertion hole 6 is located at a position where it is roughly aligned with the threaded hole 10 when the nut 9 is inserted in the nut insertion hole 4 in the horizontally longitudinal position and installed in place.

Function of the invention

When the bolt is to be inserted in the bolt insertion hole 5 at the front surface of the terminal 3 and tightened, the nut 9 is inserted in the nut insertion hole 4 from left side of the terminal 3 in the vertically longitudinal position, i. e. in a position where the long-side (dimension B2) of the side surface of the nut 9 is put in vertical direction. The nut 9 is to be inserted in this instance so that its lower end passes the nut insertion groove 7c, thus it can be inserted in the nut insertion hole 4. The insertion of the nut 9 in the nut insertion hole 4 is to be continued until it strikes against the stopper 8, and it is slid by a finger tip toward a backside of the terminal 3. Thereby, the nut 9 contacts with the small piece 7b so as to be prevented from slipping off from the nut insertion hole 4, even when the motor bicycle etc. tilts to cause the left side surface of the terminal 3 to incline to the oblique downward direction. After leaving the finger tip from the nut 9, the motor bicycle side wire harness can be handled with one hand and the bolt can be screwed in the threaded hole 10 of the nut 9 with the other. Since an insertion distance of the nut 9 into the nut insertion hole 4 is limited by the stopper 8 in this instance, the bolt insertion hole 5 is aligned with the threaded hole 10 approximately correctly.

When the bolt is to be inserted in the bolt insertion hole 6 at the upper surface of the terminal 3 and tightened, the nut 9 is inserted in the nut insertion hole 4 from left side of the terminal 3 in the horizontally longitudinal position, i. e. in a position where the short-side (dimension A2) of the side surface of the nut 9 is put in vertical direction. The nut 9 is to be inserted in this instance so that its entire body passes an upper part of the small pieces 7a and 7b i. e. a part of dimension C (FIG. 4), thus it can be inserted in the nut insertion hole 4. The insertion of the nut 9 in the nut insertion hole 4 is to be continued until it strikes against the stopper 8, and it falls on the bottom wall 4a of the nut insertion hole 4. Thereby, the nut 9 contacts with the small pieces 7a and 7b so as to be prevented from slipping off from the nut insertion hole 4, even when the motor bicycle etc. tilts to cause the left side surface of the terminal 3 to incline to the oblique downward direction. After leaving the finger tip from the nut 9, the motor bicycle side wire harness can be handled with one hand and the bolt can be screwed in the threaded hole 10 of the nut 9 with the other. Since the insertion distance of the nut 9 into the nut insertion hole 4 is limited by the stopper 8 in this instance, the bolt insertion hole 6 is aligned with the threaded hole 10 approximately correctly.

Figure 6:
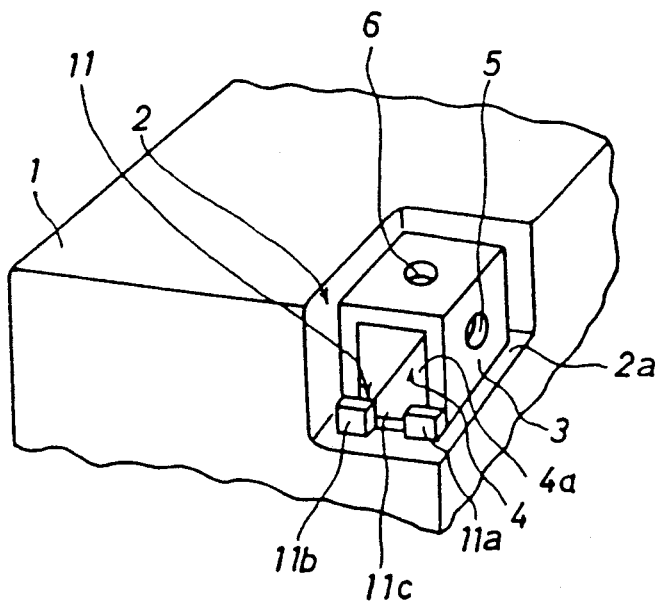
FIG. 6 is an external perspective view of a terminal means for a lead storage battery of another embodiment.
Figure 7:
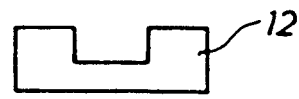
FIG. 7 is a front view of a nut anti-slipping member of further another embodiment.

The small pieces 7a and 7b of the nut anti-slipping member 7 are formed integrally with the terminal 3 in the foregoing embodiment, however, this invention is not limited to such a structure. Small pieces 11a and 11b are formed projectingly from the bottom surface 2a of the concave portion 2 of the cover 1 and a nut anti-slipping member 11 is composed of the small pieces 11a and 11b as illustrated in FIG. 6 for example, so that a clearance between the small pieces 11a and 11b may be utilized as a nut insertion groove 11c. Further, a nut anti-slipping member 12 may be formed integrally into an approximately U-shaped structure as illustrated by FIG. 7.

The nut anti-slipping members 7, 11 and 12 are formed integrally with the terminal 3 or the cover 1 in the foregoing embodiments, however, this invention is not limited to such structures. They may be formed separately from and secured to the terminal 3 or the cover 1.

The stopper 8 is provided in the foregoing embodiments, however, this invention is not limited to such structures. A wall surface of the cover 1 composing the concave portion 2 may be utilized as the stopper, for example.

Effect of the invention

According to this invention as described above, the nut anti-slipping member is provided which has a nut insertion groove and covers bottom end portions of one end of the nut insertion hole, and the nut is inserted in the nut insertion hole with the nut deviated from the nut anti-slipping member. Therefore, the nut can be positively prevented from slipping off by using the nut anti-slipping member when carrying out the bolt-fitting work under the state where the nut insertion side surface of the terminal is inclined to the oblique downward direction, and thereby enables one-man installation work of lead storage battery easily and quickly. Further, the nut exchange work can be done easily when threads of nut are corroded.

Moreover, in case of the square pole type nut with rectangular section, the nut anti-slipping member is so constructed that the entire nut can pass the upper parts of the anti-slipping members when the nut is inserted in and removed from the nut insertion hole in the horizontally longitudinal position, and the bottom part of the nut can pass the nut insertion groove when the nut is inserted in and removed from the nut insertion hole in the vertically longitudinal position. Therefore, the nut can be positively prevented from slipping off by the nut anti-slipping member regardless of a nut inserting position, when the nut fitting work is carried out under the state where the nut insertion side surface of the terminal is inclined to the oblique downward direction.

While the invention has been particularly shown and described in reference to preferred embodiments thereof, it will be understood by those skilled in the art that changes in form and details may be made therein without departing from the spirit and scope of the invention.

What is claimed is:

1. A terminal for a lead storage battery comprising:
a terminal having a bottom wall and at least one side wall, a nut insertion hole passing through a lateral direction thereof and a bolt insertion hole communicating with said nut insertion hole;
a nut inserted through said nut insertion hole; and
a nut anti-slipping member which protrudes from at least one of said bottom wall and said side wall of said terminal, said nut anti-slipping member having a nut insertion groove and occupying bottom end portions of a first opening end of said nut insertion hole, wherein said nut insertion hole and said nut are formed into a square-pole-shape, wherein the entire nut can pass upper parts of said anti-slipping member when the nut is inserted in the nut insertion hole in a horizontal longitudinal position, and wherein a bottom part of said nut can pass said nut insertion groove when said nut is inserted in said nut insertion hole in a vertical longitudinal position.

2. A terminal for a lead storage battery as set forth in claim 7, wherein said nut anti-slipping member comprises a pair of members covering both of said bottom end portions of said first opening end of said nut insertion hole, and a clearance between the pair of members includes said nut insertion groove.

3. A terminal for a lead storage battery as set forth in claim 7, wherein said nut anti-slipping member is formed integrally with said terminal.

4. A terminal for a lead storage battery as set forth in claim 7, wherein said nut anti-slipping member is formed integrally with a cover of the lead storage battery.

5. A terminal for a lead storage battery as set forth in claim 7, further comprising a stopper for limiting an insertion distance of said nut into said nut insertion hole, said stopper being installed near a second opening end opposite said first opening end of said nut insertion hole.

* * * * *